United States Patent [19]

Sinberg

[11] 4,398,066

[45] Aug. 9, 1983

[54] AUTOMATIC POWER DENIAL CIRCUIT FOR A SUBSCRIBER LINE INTERFACE CIRCUIT

[75] Inventor: Howard Sinberg, Coral Springs, Fla.

[73] Assignee: Siemens Corporation, Iselin, N.J.

[21] Appl. No.: 294,391

[22] Filed: Aug. 19, 1981

[51] Int. Cl.³ .......................................... H04M 19/00
[52] U.S. Cl. ....................................... 179/70; 179/77; 307/542; 361/58
[58] Field of Search .................... 179/70, 77, 2 A, 2 B; 307/253, 131, 542; 361/58, 59, 98, 101

[56] References Cited

FOREIGN PATENT DOCUMENTS 2065420  6/1981  United Kingdom ................... 179/77

*Primary Examiner*—Stafford D. Schreyer
*Attorney, Agent, or Firm*—Karl F. Milde, Jr.

[57] ABSTRACT

A subscriber line interface circuit is disclosed for a 2-wire telecommunication subscriber line. The circuit includes a DC voltage source for supplying power to the subscriber line and an automatic power denial circuit for interrupting the power if an overload condition exists. The power denial circuit includes two resistors connected in series in one wire of the subscriber line and a transistor connected to respond to the voltage drop across these two resistors, thereby to sense an overload condition. A second transistor, controlled by the first transistor, is connected across one of the two resistors and is biased to be normally conducting when no overload condition exists. When excessive current flows through the two resistors, indicating an overload condition, the second transistor is cut off to deny power to the subscriber line.

15 Claims, 1 Drawing Figure

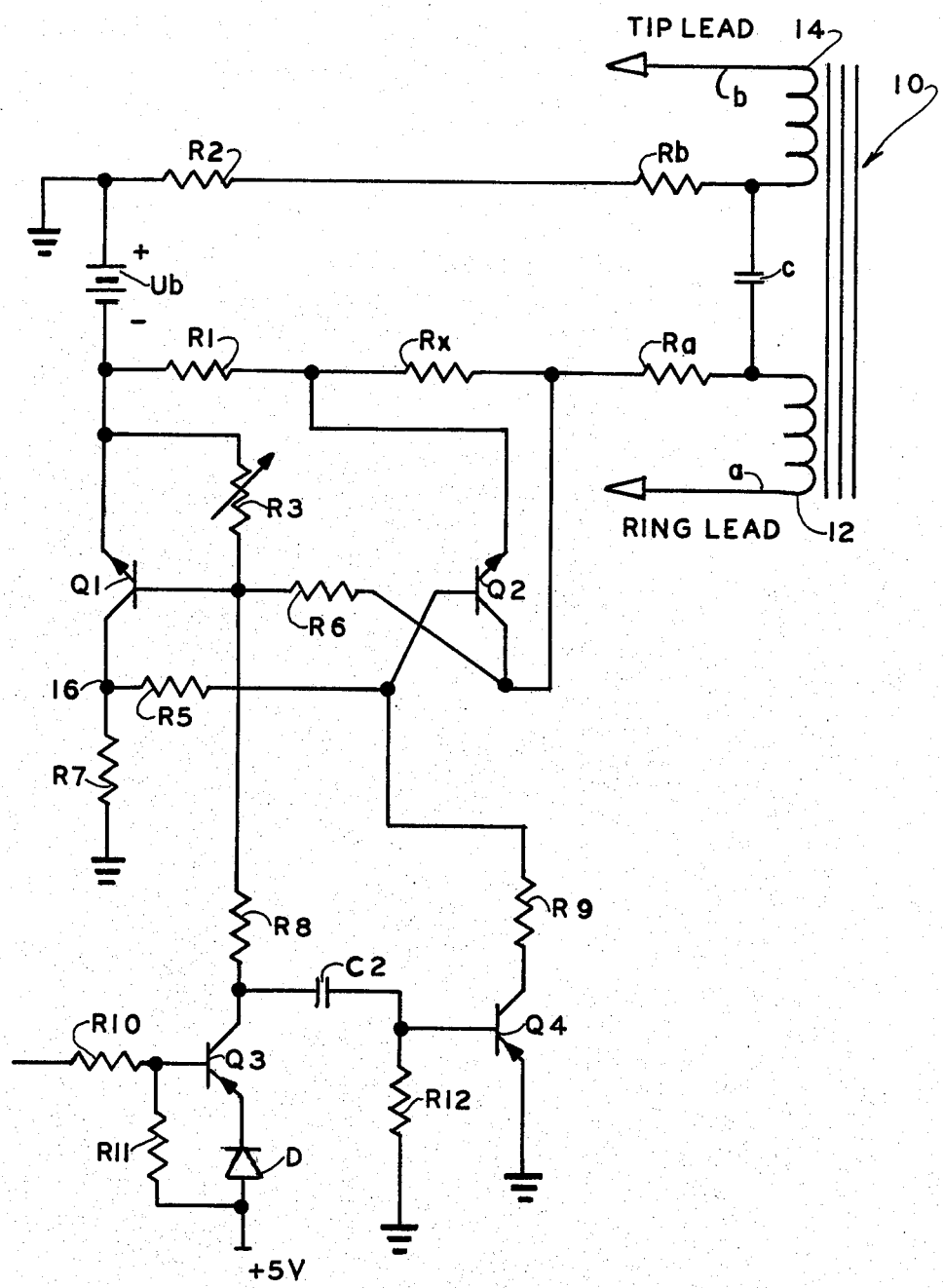

AUTOMATIC POWER DENIAL CIRCUIT FOR A SUBSCRIBER LINE INTERFACE CIRCUIT

BACKGROUND OF THE INVENTION

The present invention relates to a subscriber line interface circuit for use in a telecommunication system or exchange that supports a two-wire subscriber line.

A subscriber line interface circuit normally has a power supply comprising a DC voltage source having its negative terminal connected to the a-wire or ring lead of the subscriber line and a positive terminal connected to ground and to the b-wire or tip lead of the subscriber line. The power supply also includes a resistance/capacitance bridge in the form of a first resistor inserted in the a-wire (negative potential side) and a second resistor inserted in the b-wire (ground potential side) and a capacitor which bridges the two wires at the terminals of the two resistors on the sides opposite to the respective potential sources. This power supply is coupled on the capacitor side with a two-to-four wire hybrid transformer for the two wire/four wire transition to the system.

Subscriber line interface circuits of this kind—that is, those which contain a power supply individual to the subscriber—are provided in exchanges which contain an electronic switching matrix. In such telecommunication networks, it is necessary to guard against an overload of the circuit elements contained in the power supply bridge which may result, for example, from faulty insulation of the two-wire subscriber line.

Overdimensioning of the power supply bridge, a conceivable solution to the problem of making the bridge less susceptible to overloads, would substantially reduce the number of subscriber line interface circuits that could be combined in one subassembly.

It is therefore conventional to provide a subscriber line interface circuit with an overload protection circuit. Normally, such a protection circuit senses the voltage drop across a small resistance in series with one wire of the subscriber line and, when this voltage exceeds some predetermined value, causes the wire to be disconnected from the supply. Once the circuit is interrupted, the voltage across the sensing resistor disappears, so the protection circuit effectively forms a latch. After the overload has been removed, the protection circuit must be reset.

SUMMARY OF THE INVENTION

It is an object of the present invention to design a subscriber line interface circuit for a two-wire telecommunication subscriber line in such a way that the above-noted problems can be solved at minimum expense.

This object, as well as other objects which will become apparent from the discussion that follows, are achieved, according to the present invention, by providing an automatic power denial circuit in one wire of the subscriber line which sharply reduces the current supplied to this wire when an overload condition exists but which resets itself upon removal of the overload. This power denial circuit includes a relatively low-value, first resistor and a relatively high-value second resistor connected in series in one wire of the subscriber line. A first transistor is connected to respond to the voltage drop across the two resistors, thereby to sense an overload condition, and a second transistor is connected across the second resistor and is controlled by the first transistor in such a way that it is normally conducting when no overload condition exists, thereby providing a low resistance circuit path around the second resistor. This second transistor is cut off by the first transistor when an overload condition appears, thereby interrupting the circuit path around the second resistor and denying power to the subscriber line.

In this way, the voltage across the low value, first resistor will be sensed to indicate an overload condition. After the second transistor is cut off, the voltage across the high value, second resistor will be sensed to determine when the overload condition ceases. This subscriber line interface circuit, according to the invention, therefore operates to reset itself and is yet simple and inexpensive.

According to a preferred embodiment of the invention, the base-emitter path of the first transistor is connected across the first and second resistors and the collector of this transistor is connected by another resistor to the other wire of the subscriber line. In addition, the emitter-collector path of the second transistor is connected across the second resistor and the base of this second transistor is connected to the collector of the first transistor via still another resistor.

The biasing network for the first transistor preferably comprises two relatively high-value resistors connected in series across the first and second resistors. The connecting point between the high-value resistors is connected to the base of the first transistor and provides a bias such that the first transistor is normally cut off when no overload condition exists and is conducting when an overload condition is present. For example, the first transistor may be caused to switch from cut-off to the conducting state when a current of 25 MA or more flows through the first and second resistors.

According to a further development of the invention, an additional circuit is provided for switching off the second transistor, so as to deny power to the subscriber line, upon receipt of an external command signal. This switching circuit includes a second DC voltage source and a third transistor, connected with its emitter-collector path between the second DC voltage source and the base of the first transistor. The base of this third transistor is connected to receive the command signal, thus causing the third transistor to saturate and switch the state of the first transistor when a command signal is received.

According to a still further development of the invention, there is provided a fourth transistor having its emitter-collector path connected between the other wire of the subscriber line and the base of the second transistor. A capacitor is connected between the emitter-collector path of the third transistor and the base of the fourth transistor to cause the fourth transistor to switch on momentarily when a command signal is terminated. In this way, the potential of the other wire of the subscriber line is applied to the base of the second transistor, assuring prompt saturation of the second transistor and reestablishing normal current in the subscriber line.

For a full understanding of the present invention, reference should not be made to the following detailed description of one preferred embodiment of the invention and to the accompanying drawing.

BRIEF DESCRIPTION OF THE DRAWING

The single FIGURE is a schematic diagram of a portion of a subscriber line interface circuit incorporating the preferred embodiment of the present invention.

DESCRIPTION OF THE PREFERRED EMBODIMENT

The preferred embodiment of the present invention will now be described in connection with the single FIGURE of the drawing. The illustrated subscriber line interface circuit comprises a conventional two-to-four hybrid transformer 10 of which only two windings 12 and 14 are shown. The winding 12 passes current for the a-wire or ring lead of the subscriber line, and the winding 14 passes current for the b-wire or tip lead of the subscriber line.

Power is supplied to the a-wire and b-wire by a power supply bridge comprising the resistors Ra and Rb, a capacitor C and a voltage source or supply battery Ub. The positive terminal of the supply battery is connected to the b-wire and to ground, whereas the negative terminal is connected to the a-wire. The capacitor C is connected across the a-wire and b-wire at a point between the resistors Ra and Rb and the windings 12 and 14. This capacitor establishes the AC signal path between the windings.

The automatic power denial circuit according to the present invention is connected into the a-wire or negative potential side of the subscriber line interface circuit. This circuit includes a relatively low-value resistor R1 and a relatively high-value resistor Rx connected in series with the resistor Ra. In order to balance the impedance, a relatively low-value resistor R2 is also inserted in the b-wire in series with the resistor Rb, or the value of Rb is correspondingly increased. For example, the values of the resistors R1, R2 and Rx may be 50 ohms, 50 ohms and 10K ohms, respectively.

The power denial circuit further comprises a sensing transistor Q1 and a power controlling transistor Q2 connected as shown in the FIGURE. The base of the transistor Q1 is connected to the center point of a resistor series comprising resistors R3 and R6 connected across the resistors R1 and Rx. Depending upon the relative values of the resistors R3 and R6, which can be varied by adjusting R3, the transistor Q1 is biased to cut-off when normal current flows through the resistors R1 and Rx. However, when this current exceeds a safe operating limit, say 50 MA, the transistor Q1 switches on, permitting current to flow from the negative terminal of the voltage supply Ub to ground via the resistor R7. This change of state of the transistor Q1 reduces the voltage at the node 16 to the negative potential of the DC source Ub. This voltage is applied to the base of the transistor Q2 via the resistor R5.

Under normal circumstances, the transistor Q2 is saturated and provides a short circuit path across the high-value resistor Rx. As the collector of transistor Q1 starts to go negative, the increasing negative voltage applied to the base of the transistor Q2 brings it out of saturation. As the voltage drop across the transistor Q2 increases, the base of the transistor Q1 goes increasingly positive so that the changes of states of Q1 and Q2 are regenerative and happen very quickly.

With the transistor Q2 at cutoff, the current through the a-wire is reduced to a safe level. Since the transistor Q1 now senses a voltage across a much higher resistance, namely R1 and Rx, even the small current through the resistors R1 and Rx is enough to sustain the transistor Q1 in saturation. When the overload condition is removed, the voltage drop across the resistors R1 and Rx is diminished. In this case, the transistor Q1 is switched from saturation to cut-off, driving the transistor Q2 from cut-off to saturation. In this way, the circuit is automatically reset.

It is sometimes desirable to limit the current in a subscriber line, even though the line is not in an overload state. For example, it is advantageous to test the automatic power denial circuit to insure its proper working condition. To permit such operation, a circuit may be provided to cause the transistors Q1 and Q2 to change their states upon receipt of an external command signal. Such a circuit is shown in the lower portion of the FIGURE.

The optional circuit comprises a transistor Q3 connected with its emitter-collector path between a +5 V supply and the base of the transistor Q1. A diode D is placed in the emitter-collector path as well as a high-value resistor R8. An external command signal is supplied to the base of the transistor Q3 via the voltage divider formed by resistors R10 and R11. If a logical "0" is applied to the base of the transistor Q3, this transistor will conduct so that its collector and, in turn, the base of the transistor Q1 will go positive. As a result, the transistor Q1 will turn on and the transistor Q2 will toggle off.

Still another transistor Q4 has its emitter-collector path connected between the base of the transistor Q2 and ground via another high-value resistor R9. The base of the transistor Q4 is driven by the incremental signal passed through a capacitor C2 to ground via a resistor R12. The application of a logical "1" to the base of the transistor Q3 turns it off and supplies a negative pulse to the base of the transistor Q4. This momentarily turns on the transistor Q4 and grounds the base of the transistor Q2 through the resistor R9. This assures that the transistor Q2 saturates and the transistor Q1 is switched off, thus reestablishing normal current in the subscriber line.

There has thus been shown and described a novel automatic power denial circuit for a subscriber line interface circuit which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

I claim:

1. A subscriber line interface circuit for a two-wire telecommunication subscriber line, comprising in combination:
   (a) means for supplying DC power to said subscriber line including a DC voltage source connected across the two wires thereof;
   (b) an automatic power denial circuit, including:
      (1) a relatively low value, first resistor connected in one wire of said subscriber line;
      (2) a relatively high value, second resistor connected in series with said first resistor;
      (3) a first transistor connected to respond to the voltage drop across said first and said second resistors, thereby to sense an overload condition; and (4) a second transistor, connected across said second resistor and controlled by said first transistor, said second transistor being biased to be normally conducting when no overload condition exists, thereby providing a low resistance circuit path around said second resistor, and biased to be cut off when an overload condition exists, thereby to interrupt said circuit path around said second resistor and deny power to said subscriber line.

2. The circuit recited in claim 1, further comprising a relatively low value, third resistor connected in the other wire of said subscriber line, to provide an equally matched impedance to that of said one wire when no overload condition exists.

3. The circuit recited in claim 2, further comprising a two-four wire hybrid transformer having two windings on the two-wire side, a first winding connected in said one wire of said subscriber line in series with said first and second resistors and a second winding connected in said other wire of said subscriber line in series with said third resistor.

4. The circuit defined in claim 3, further comprising a capacitor connected between said two wires of said subscriber line to insure AC-signalling symmetry, said capacitor being connected to said two wires at a point between said resistors and said two windings.

5. The circuit defined in claim 4, further comprising a fourth resistor connected in series with said first and second resistors and a fifth resistor connected in series with said third resistor, said fourth and fifth resistors providing a balanced impedance to said subscriber line.

6. The circuit defined in claim 5, wherein said fourth resistor is connected between the combination of said first and second resistors, and the point of connection of said capacitor, and said fifth resistor is connected between said third resistor and the point of connection of said capacitor.

7. The circuit recited in claim 1, wherein said first transistor is biased to be normally cut off when no overload conditions exist and to be conducting when an overload condition exists.

8. The circuit recited in claim 1, wherein a first pole of said DC voltage source is connected to said one wire of said subscriber line and a second pole is connected to the other wire of said subscriber line and to ground.

9. The circuit recited in claim 1, wherein the base-emitter path of said first transistor is connected across said first and second resistor and the collector of said first transistor is connected via a sixth resistor to the other wire of said subscriber line.

10. The circuit recited in claim 9, wherein the emitter-collector path of said second transistor is connected across said second resistor and the base of said second transistor is connected to the collector of said first transistor.

11. The circuit recited in claim 10, further comprising a seventh resistor connected between the base of said second transistor and the collector of said first transistor.

12. The circuit recited in claim 9, further comprising relatively high value, eighth and ninth resistors connected in series across said first and said second resistors, the connecting point between said eighth and ninth resistors being connected to the base of said first transistor and providing a bias such that said first transistor is normally cut off when no overload condition exists and is conducting when an overload condition exists.

13. The circuit recited in claim 1, further comprising:
(a) circuit means, responsive to a command signal, for switching off said second transistor so as to deny power to said subscriber line upon command, said switching means including:
  (1) a second DC voltage source;
  (2) a third transistor, connected with its emitter-collector path between said second DC voltage source and the base of said first transistor, the base of said third transistor being connected to receive said command signal.

14. The circuit recited in claim 13, further comprising a fourth transistor having its emitter-collector path connected between the other wire of said subscriber line and the base of said second transistor, whereby the potential of said other wire is momentarily applied to the base of said second transistor when normal power is to be re-established to assure prompt saturation of said second transistor.

15. The circuit recited in claim 14, further comprising a capacitor connected between the emitter-collector path of said third transistor and the base of said fourth transistor.

* * * * *